US012809372B2

(12) United States Patent
Takano

(10) Patent No.: US 12,809,372 B2
(45) Date of Patent: Nov. 24, 2026

(54) MARINE VESSEL MANEUVERING APPARATUS AND INFORMATION PROCESSING SYSTEM

(71) Applicant: YAMAHA HATSUDOKI KABUSHIKI KAISHA, Iwata (JP)

(72) Inventor: Naoju Takano, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 235 days.

(21) Appl. No.: 18/112,532

(22) Filed: Feb. 22, 2023

(65) Prior Publication Data

US 2023/0280749 A1 Sep. 7, 2023

(30) Foreign Application Priority Data

Mar. 3, 2022 (JP) ................................ 2022-032590

(51) Int. Cl.
*G05D 1/00* (2024.01)
*A01K 97/12* (2006.01)
*B63B 79/40* (2020.01)

(52) U.S. Cl.
CPC ......... *G05D 1/0206* (2013.01); *A01K 97/125* (2013.01); *B63B 79/40* (2020.01); *G05D 1/0016* (2013.01); *G05D 1/0022* (2013.01); *B63B 2213/02* (2013.01)

(58) Field of Classification Search
CPC .. G05D 1/0206; G05D 1/0016; G05D 1/0022; A01K 97/125; B63B 79/40; B63B 2213/02; B63B 34/05; B63B 2035/008; B63B 35/14; B63B 49/00
See application file for complete search history.

(56) References Cited

U.S. PATENT DOCUMENTS 8,015,507 B2 * 9/2011 Madsen ............... G05D 1/0038 715/846
10,082,788 B1 9/2018 Dengel et al.
2006/0116204 A1 * 6/2006 Chen ...................... A63H 30/04 463/37
2006/0206244 A1 * 9/2006 Arvidsson ........... G05D 1/0033 701/1
2012/0015566 A1 * 1/2012 Salmon ................ G05D 1/0206 701/467

FOREIGN PATENT DOCUMENTS

JP 2003204583 A * 7/2003
WO WO-2017112778 A1 * 6/2017 ........... A01K 87/007

OTHER PUBLICATIONS

ANGLR Bullseye, https://www.anglr.com/anglr-bullseye-bluetooth-fishing-tracker, accessed Dec. 9, 2024. (Year: 2021).*

(Continued)

*Primary Examiner* — Scott A Browne
*Assistant Examiner* — Jisun Choi
(74) *Attorney, Agent, or Firm* — Keating & Bennett, LLP

(57) ABSTRACT

A marine vessel maneuvering apparatus performs maneuvering of a marine vessel by wireless communication, and includes an operator to move the marine vessel in an operating direction of the operator, a recorder to record location information of a place where fishing is performed using the marine vessel that is moved by operating the operator, and a controller connected to at least the recorder.

12 Claims, 5 Drawing Sheets

(56) References Cited

OTHER PUBLICATIONS

FishAngler—Fishing App, FishAngler, LLC, https://play.google.com/store/apps/details?id=com.fishangler.fishangler&referrer=utm_source%3Dhomepage%26utm_medium%3Dwebsite, released on Jul. 11, 2016, accessed on Mar. 21, 2025. (Year: 2016).*

Strikelines, StrikeLines Tampa LLC, https://strikelines.com/, captured on Aug. 5, 2018 by Wayback Machine, accessed on Mar. 21, 2025. (Year: 2018).*

Machine translation of JP_2003204583_A (Year: 2003).*

Flic, "Fishing Intelligence: AnglR", https://flicio/blog/smart-fishing-anglr, May 7, 2020, 5 pages.

* cited by examiner

MARINE VESSEL MANEUVERING APPARATUS AND INFORMATION PROCESSING SYSTEM

CROSS REFERENCE TO RELATED APPLICATIONS

This application claims the benefit of priority to Japanese Patent Application No. 2022-032590, filed on Mar. 3, 2022. The entire contents of this application are hereby incorporated herein by reference.

BACKGROUND OF THE INVENTION

1. Field of the Invention

The present invention relates to a marine vessel maneuvering apparatus and an information processing system.

2. Description of the Related Art

For the purpose of improving operability, marine vessels that are each provided with a joystick, which is a marine vessel maneuvering mechanism different from a steering wheel and an electronic remote controller, are known. In some of the marine vessels, the joystick is able to be separated from a marine vessel maneuvering seat and to be portable (for example, see U.S. Pat. No. 10,082,788). In such a marine vessel, a marine vessel user is able to operate the joystick while carrying it. In addition, in the case that the marine vessel is used as a fishing boat, when the marine vessel user fishes in the sea or in a river, the marine vessel user sometimes carries an operation device for recording location information of a place where the fishing is performed (for example, see "Fishing Intelligence: Anglr", posted online by Maria Campo on, May 7, 2020, Flick.

However, in the case that the marine vessel user wants to record the location information of the place where the fishing is performed when the marine vessel user separates the joystick from the marine vessel maneuvering seat and is operating the joystick, it is necessary for the marine vessel user to record the location information of the place where the fishing is performed by operating the operation device different from the joystick. Therefore, there is room for improvement in the operability of the device for recording the location information.

SUMMARY OF THE INVENTION

Preferred embodiments of the present invention provide marine vessel maneuvering apparatuses and information processing systems that are each able to improve the operability of a device to record location information.

According to a preferred embodiment of the present invention, a marine vessel maneuvering apparatus that maneuvers a marine vessel by wireless communication includes an operator to move the marine vessel in an operating direction of the operator, a recorder to record location information of a place where fishing is performed using the marine vessel that is moved by operating the operator, and a controller connected to at least the recorder.

According to another preferred embodiment of the present invention, a marine vessel maneuvering apparatus that maneuvers a marine vessel by wireless communication includes an operator to move the marine vessel in an operating direction of the operator, and a recorder to record location information of a place where an activity is performed using the marine vessel that is moved by operating the operator.

According to another preferred embodiment of the present invention, an information processing system includes a marine vessel maneuvering apparatus to maneuver a marine vessel, and a communication apparatus communicably connected to an information communication network. The marine vessel maneuvering apparatus includes an operator to move the marine vessel, and a recorder to record location information of a place where fishing is performed using the marine vessel that is moved by operating the operator. The communication apparatus is operable to transmit the recorded location information to the information communication network.

According to preferred embodiments of the present invention, it is possible to move the marine vessel in an operating direction of the operator included in the marine vessel maneuvering apparatus. Moreover, with the recorder of the marine vessel maneuvering apparatus, it is possible to record the location information of the place where the fishing is performed using the marine vessel that is moved by operating the operator, or the location information of the place where the activity is performed using the marine vessel that is moved by operating the operator. Therefore, the marine vessel user is able to use the marine vessel maneuvering apparatus to move the marine vessel and record the location information. As a result, the marine vessel user is able to eliminate the need to operate an operation device different from the marine vessel maneuvering apparatus when recording the location information, and thus, the operability of the device to record the location information is improved. As a result, it is possible to improve the operability of the device to record the location information.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the drawings.

The preferred embodiments of the present invention will be described in detail below with reference to FIGS. 1 to 5. However, configurations described in the following preferred embodiments are merely examples, and the scope of the present invention is not limited by the configurations described in the following preferred embodiments.

Figure 1:
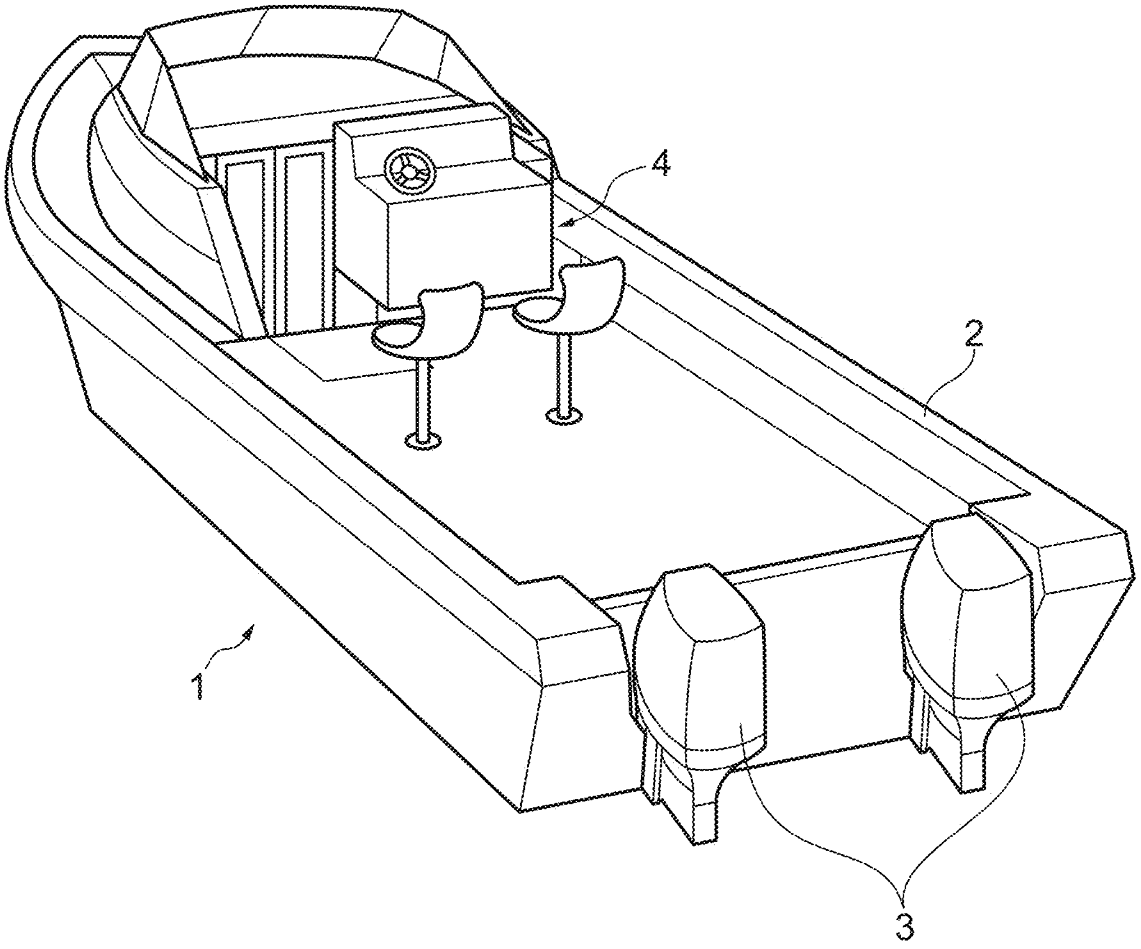
FIG. 1 is a perspective view of a marine vessel to be maneuvered by a marine vessel maneuvering apparatus according to a preferred embodiment of the present invention.

FIG. 1 is a perspective view of a marine vessel that is able to be maneuvered by a marine vessel maneuvering apparatus according to a preferred embodiment of the present invention. A marine vessel 1 shown in FIG. 1 includes a hull 2, and a plurality of, for example, two outboard motors 3 that function as propulsion devices and are mounted on the hull 2. It should be noted that the number of the outboard motors 3 provided on the marine vessel 1 is not limited to two, and may be one or three or more. The two outboard motors 3 are mounted side by side on the stern of the hull 2. Each outboard motor 3 includes an engine (not shown) which may be an internal combustion engine functioning as a power source, and obtains a thrust from a propeller (not shown) which is rotated by a driving force of the corresponding engine. It should be noted that each outboard motor 3 may include an electric motor functioning as the power source, or may include both an engine and an electric motor functioning as the power source. In addition, in the marine vessel 1, a maneuvering seat 4 is provided on the bow side, which is the front portion of the hull 2.

Figure 2:
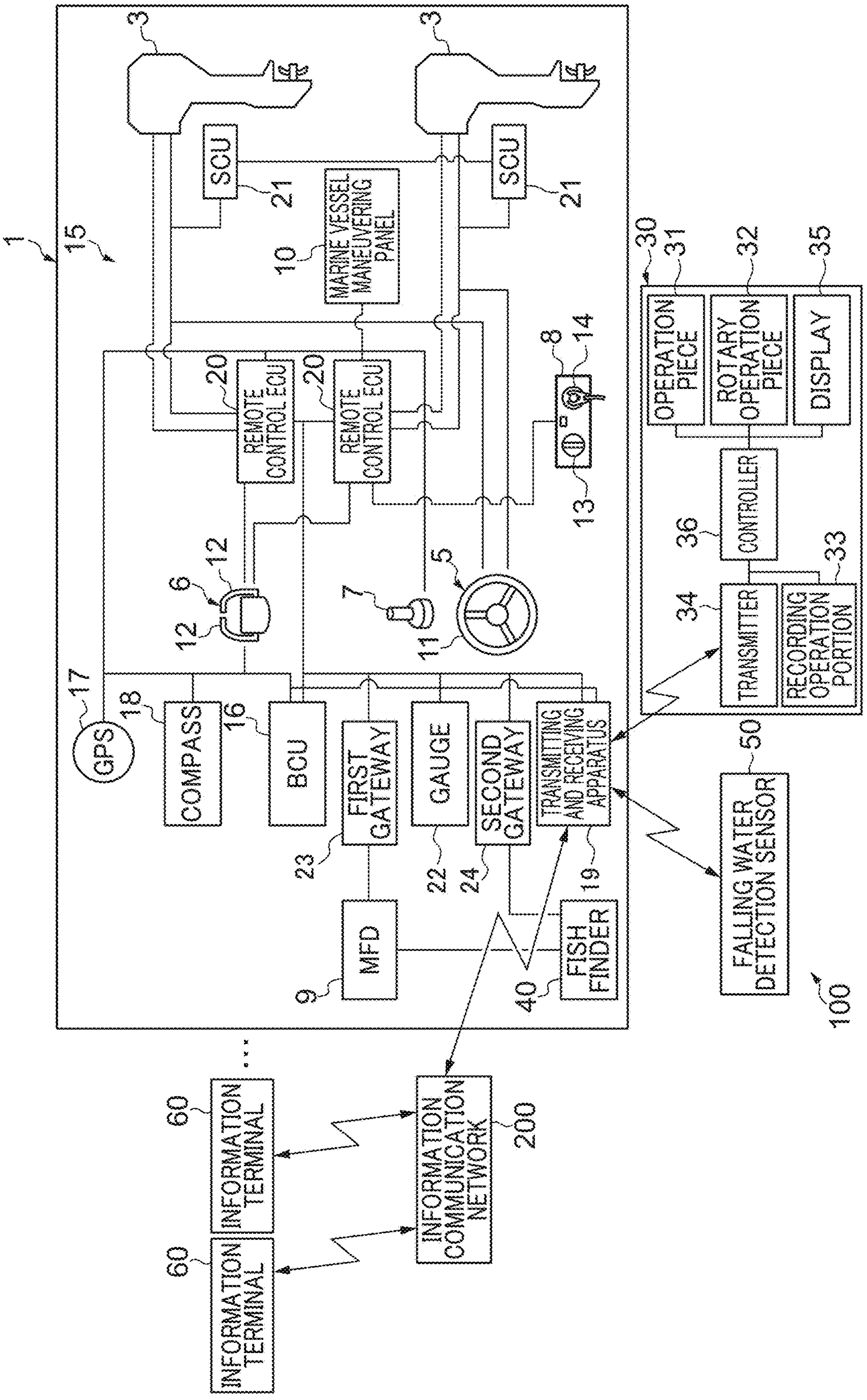
FIG. 2 is a block diagram for schematically explaining a configuration of an information processing system that includes the marine vessel maneuvering apparatus according to a preferred embodiment of the present invention.

FIG. 2 is a block diagram for schematically explaining a configuration of an information processing system that includes the marine vessel maneuvering apparatus according to a preferred embodiment of the present invention. An information processing system 100 shown in FIG. 2 includes a marine vessel maneuvering apparatus 30 that is used to maneuver the marine vessel 1, and a transmitting and receiving apparatus 19 functioning as a communication apparatus that is communicably connected to an external information communication network 200. The marine vessel maneuvering apparatus 30 is a remote operation device that maneuvers the marine vessel 1 by wireless communication, and is portable. On the marine vessel 1, the marine vessel maneuvering apparatus 30 is able to be carried by a marine vessel user. As a result, the marine vessel maneuvering apparatus 30 is able to be used in a place different from the maneuvering seat 4. Therefore, for example, when the marine vessel 1 is docked at a pier or a wharf, the marine vessel user is able to operate the marine vessel maneuvering apparatus 30 while confirming the docking state of the marine vessel 1 at the gunwale of the marine vessel 1 away from the maneuvering seat 4. The transmitting and receiving apparatus 19 is mounted on the marine vessel 1.

As shown in FIG. 2, the marine vessel 1 includes a marine vessel propulsion control system 15. The marine vessel propulsion control system 15 includes the outboard motors 3, a steering mechanism 5, a remote control unit 6, a joystick 7, a main operation portion 8, an MFD (Multi Function Display) 9, a marine vessel maneuvering panel 10, and a BCU (Boat Control Unit) 16, a GPS (Global Positioning System) 17, a compass 18, remote control ECUs (Engine Control Units) 20, SCUs (Steering Control Units) 21, a gauge 22, a first gateway 23, and a second gateway 24. Respective components of the marine vessel propulsion control system 15 are communicably connected to each other, for example, by a CAN (Control Area Network) or the like. The steering mechanism 5, the remote control unit 6, the joystick 7, the main operation portion 8, the MFD 9, the marine vessel maneuvering panel 10, and the gauge 22 are located on the maneuvering seat 4.

The steering mechanism 5 enables the marine vessel user to determine the course of the marine vessel 1. The steering mechanism 5 includes a steering wheel 11 which is rotatably operable. The steering mechanism 5 accepts an operation of the steering wheel 11 performed by the marine vessel user, and transmits a steering angle corresponding to the accepted operation to each remote control ECU 20. The remote control unit 6 includes levers 12 corresponding to the outboard motors 3, respectively. By operating each lever 12, the marine vessel user is able to switch a direction of the thrust generated by the corresponding outboard motor 3 between a forward moving direction and a backward moving direction, and adjust the output of the corresponding outboard motor 3 so as to adjust a vessel speed of the marine vessel 1. The joystick 7 is a control stick for the marine vessel user to navigate the marine vessel 1. The marine vessel 1 is configured such that the maneuvering mode is able to be switched between a plurality of modes, for example, a normal mode and a joystick mode. In the normal mode, the outboard motor 3 works mainly in response to an operation of the steering mechanism 5 and an operation of the remote control unit 6. On the other hand, in the joystick mode, the outboard motor 3 works mainly in response to an operation of the joystick 7. The signals from the joystick 7 are transmitted to each remote control ECU 20 and the BCU 16. It is possible to switch between the normal mode and the joystick mode by a change-over switch (not shown).

The main operation portion 8 includes a main switch 13 and an engine shutoff switch 14. The main switch 13 (one main switch 13) is provided in common for the outboard motors 3 (respective outboard motors 3). The main switch 13 is an operator to collectively start and collectively stop the engines of the outboard motors 3 (the respective outboard motors 3). The engine shutoff switch 14 is connected to the marine vessel user via a lanyard and is a switch for emergency-stopping the engines of the outboard motors 3 (the respective outboard motors 3). The MFD 9 includes, for example, a color LCD display. The MFD 9 functions as a display to display various kinds of information, and also functions as a touch panel to accept inputs from the marine vessel user. On the marine vessel maneuvering panel 10, it is possible to select various kinds of maneuvering modes, for example, a course holding mode and a fixed point holding mode.

The BCU 16 obtains the state of the marine vessel 1 based on the signals transmitted from the respective components of the marine vessel propulsion control system 15, determines the magnitude of a thrust that each outboard motor 3 should generate and an acting direction of the thrust that should be taken, and transmits the results of these determinations to each remote control ECU 20. The GPS 17 obtains the current location of the marine vessel 1 and transmits the current location of the marine vessel 1 to the BCU 16. The compass 18 obtains a direction (a yaw angle) of the marine vessel 1 and transmits the direction of the marine vessel 1 to the BCU 16. One remote control ECU 20 is provided for each outboard motor 3. The remote control ECU 20 controls the engine of the corresponding outboard motor 3 and a steering unit (not shown) in response to the signals transmitted from the BCU 16, the steering mechanism 5, the remote control unit 6, the joystick 7, etc. so as to adjust the thrust and an acting direction of the thrust of the corresponding outboard motor 3. The SCU 21 is provided to correspond to each outboard motor 3, and controls the steering unit to horizontally turn the corresponding outboard motor 3 with respect to the hull 2 of the marine vessel 1 so as to change the acting direction of the thrust of each outboard motor 3.

The gauge 22 is a display device that displays information about the engine of each outboard motor 3, information about the hull 2 (the marine vessel 1), etc. These pieces of information include, for example, a rotation number of the engine, a remaining amount of fuel, etc. The first gateway 23 is a repeater, and is able to convert, for example, various kinds of communication information transmitted to the MFD 9 into a state that the MFD 9 is able to receive. The second gateway 24 is a repeater, and is able to convert, for example, various kinds of communication information transmitted to a fish finder 40 into a state that the fish finder 40 is able to receive. The transmitting and receiving apparatus 19 is communicably connected to the respective components of the marine vessel propulsion control system 15. In a preferred embodiment of the present invention, the transmitting and receiving apparatus 19 is a cellular data communication module (hereinafter, referred to as "a DCM (Data Communication Module)") which is a communication terminal. The DCM is a module able to perform wireless communications conforming to a predetermined communication standard. For example, the DCM is a module able to perform communications conforming to the "International Mobile Telecommunication (IMT)-Advanced" standard (the so-called 4G standard) defined by the International Telecommunication Union (ITU), or communications conforming to the "IMT-2020" standard (the so-called 5G standard). It should be noted that the DCM may be a communication module that performs communications conforming to a communication standard other than the communication standards described above.

The marine vessel 1 also includes the fish finder 40 in addition to the marine vessel propulsion control system 15. The fish finder 40 is communicably connected to the transmitting and receiving apparatus 19 via the MFD 9 and the first gateway 23 and is communicably connected to the transmitting and receiving apparatus 19 via the second gateway 24. The fish finder 40 is operable to generate ultrasonic waves toward the water directly below the marine vessel 1, detect the reflected waves of the ultrasonic waves, and display underwater conditions such as fish shoals and the depth of the water on a display 41 (see FIG. 5).

As described above, the marine vessel user is able to maneuver the marine vessel 1 by using the marine vessel maneuvering apparatus 30. In a preferred embodiment of the present invention, the marine vessel 1 is configured such that the maneuvering mode is able to be switched to a marine vessel maneuvering apparatus use mode in addition to the normal mode and the joystick mode. The marine vessel maneuvering apparatus use mode is a mode used when the marine vessel user maneuvers the marine vessel 1 by using the marine vessel maneuvering apparatus 30. As shown in FIG. 2, the marine vessel maneuvering apparatus 30 includes an operator (a moving operator) 31, a rotary operator 32, a recording operation portion 33, a transmitter 34, a display 35, and a controller 36. In addition, the operator (an operation piece) 31, the rotary operator (a rotary operation piece) 32, the recording operation portion 33, the transmitter 34, and the display 35 are connected to the controller 36.

Figure 3:
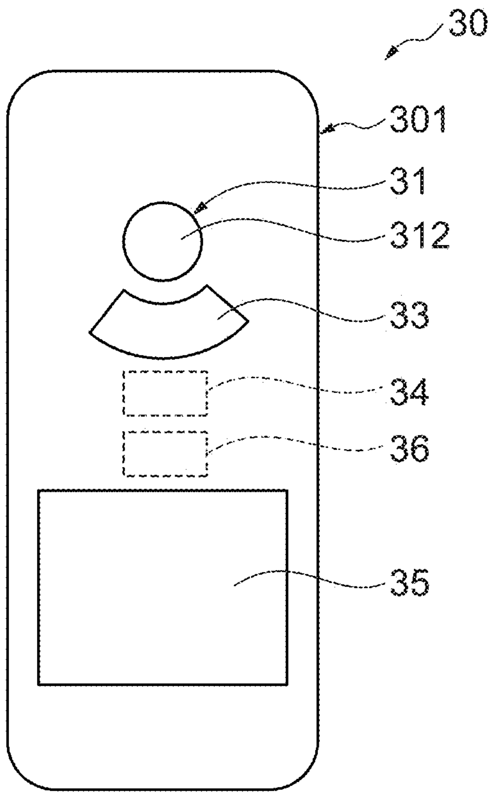
FIG. 3 is a plan view of the marine vessel maneuvering apparatus according to a preferred embodiment of the present invention.

FIG. 3 is a plan view of the marine vessel maneuvering apparatus according to a preferred embodiment of the present invention. As shown in FIG. 3, the marine vessel maneuvering apparatus 30 includes a housing 301. The housing 301 also functions as a grip portion that is gripped when the marine vessel user operates the marine vessel maneuvering apparatus 30. The operator 31, the recording operation portion 33, and the display 35 are located on the front side of the housing 301. It should be noted that in a preferred embodiment of the present invention, although the operator 31, the recording operation portion 33, and the display 35 are arranged in this order from the top in FIG. 3, the arrangement manner (the layout) of the operator 31, the recording operation portion 33, and the display 35 is not limited to this.

Figure 4:
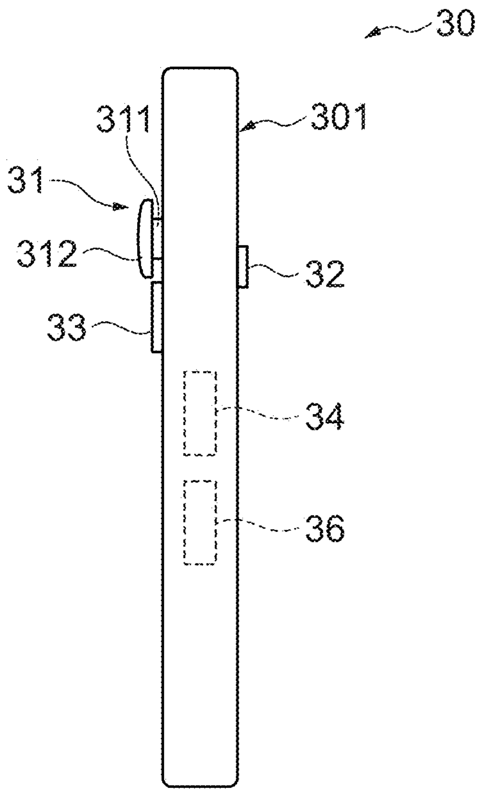
FIG. 4 is a side view of the marine vessel maneuvering apparatus according to a preferred embodiment of the present invention.

The operator 31 is an operation member to move the marine vessel 1 in an operating direction of the operator 31. The operator 31 is tiltable toward four directions with respect to the housing 301, that is, it is supported so as to be able to swing freely with respect to the housing 301. The operator 31 includes a columnar portion 311 having a columnar shape and a flat portion 312 provided at the top of the columnar portion 311 (e.g., the top being at the left side of the columnar portion 311 as seen in FIG. 4) and having a flat shape. The operator 31 protrudes just enough from the housing 301 to the front side to a degree sufficient for a tilting operation of the operator 31. When the marine vessel user tilts the operator 31 (performs the tilting operation of the operator 31), the marine vessel user is able to put, for example, his or her thumb on the flat portion 312. In addition, in the marine vessel maneuvering apparatus 30, in order for the marine vessel user to intuitively maneuver the marine vessel 1, for example, when the marine vessel user tilts the operator 31 forward and backward (in a vertical direction in FIG. 3) with his or her thumb, the controller 36 generates a signal to move the marine vessel 1 forward and backward.

Furthermore, when the marine vessel user tilts the operator 31 leftward and rightward (in a left/right direction in FIG. 3), the controller 36 generates a signal to move the marine vessel 1 leftward and rightward.

Each signal generated by the controller 36 is transmitted from the transmitter 34 and is received by the transmitting and receiving apparatus 19. After that, each signal generated by the controller 36 is transmitted to each remote control ECU 20 and the BCU 16. In addition, the controller 36 generates a signal to generate a thrust corresponding to a tilting amount of the operator 31. The signal to generate the thrust corresponding to the tilting amount of the operator 31 is also transmitted from the transmitter 34 to each remote control ECU 20 and the BCU 16 via the transmitting and receiving apparatus 19. Thus, by operating the operator 31, the marine vessel user is able to maneuver the marine vessel 1 with a course corresponding to a tilting direction of the operator 31 and the thrust corresponding to the tilting amount of the operator 31. The display 35 may be, for example, a liquid crystal display or an organic electroluminescent display, and is able to display various kinds of color images. In addition, signals generated by each remote control ECU 20 and the BCU 16 are able to be transmitted from the transmitting and receiving apparatus 19 and to be received by the transmitter 34. In this case, the transmitter 34 also functions as a receiver that receives signals. The signals received by the transmitter 34 are visualized and displayed on the display 35.

The transmitter 34 and the controller 36 are located inside the housing 301. The transmitter 34 includes, for example, a main oscillator, a frequency multiplier, a modulator, a power amplifier, etc., and is able to wirelessly communicate with the transmitting and receiving apparatus 19. The controller 36 includes, for example, a CPU (Central Processing Unit), various kinds of memories, etc., and controls the operations of the display 35, etc.

FIG. 4 is a side view of the marine vessel maneuvering apparatus according to a preferred embodiment of the present invention. As shown in FIG. 4, the rotary operator 32 is located on the back side of the housing 301. The rotary operator 32 is an operation member to turn the marine vessel 1 in an operating direction of the rotary operator 32. The rotary operator 32 is tiltable toward two directions with respect to the housing 301, that is, it is supported so as to be able to swing freely with respect to the housing 301. The rotary operator 32 protrudes just enough from the housing 301 to the back side to a degree sufficient for a tilting operation of the rotary operator 32. When the marine vessel user tilts the rotary operator 32 (performs the tilting operation of the rotary operator 32), the marine vessel user is able to put, for example, his or her index finger on the rotary operator 32. When the marine vessel user tilts the rotary operator 32 with his or her index finger toward, for example, the depth side in FIG. 4, the controller 36 generates a signal to turn the marine vessel 1 to, for example, the port. In addition, when the marine vessel user tilts the rotary operator 32 toward, for example, the front side in FIG. 4, the controller 36 generates a signal to turn the marine vessel 1 to, for example, the starboard.

Each signal generated by the controller 36 is transmitted from the transmitter 34 and is received by the transmitting and receiving apparatus 19. After that, each signal generated by the controller 36 is transmitted to each remote control ECU 20 and the BCU 16. It should be noted that although the operator 31 and the rotary operator 32 are provided separately, the configuration is not limited to this. For example, the rotary operator 32 may be omitted, and the operator 31 may also function as the rotary operator 32.

The recording operation portion 33 is an operation member to record location information 37 of a place where fishing is performed on the marine vessel 1 that is moved by operating the operator 31 and/or the rotary operator 32 (hereinafter, referred to as "a fishing point"). It should be noted that the fish finder 40 and the external information communication network 200 (see FIG. 2) are the recording destination (the transmitting destination) of the location information 37. For example, in the case that the marine vessel user or a passenger as a fisherman is fishing on the marine vessel 1, when the marine vessel user judges that a relatively high fishing result has been obtained or will be obtained, the marine vessel user is able to record the location information 37 of the fishing point by operating the recording operation portion 33.

As a result, the marine vessel user is able to grip the marine vessel maneuvering apparatus 30, and to perform a recording operation to record the location information 37 while maneuvering (also including stopping) the marine vessel 1 by using the marine vessel maneuvering apparatus 30. Therefore, it is not necessary to prepare a device for the recording operation of the location information 37 which is different from the marine vessel maneuvering apparatus 30. As a result, the marine vessel user is able to eliminate the need to operate an operation device different from the marine vessel maneuvering apparatus 30 when recording the location information 37, and thus, the operability of the device for recording the location information 37 is improved. In addition, when the marine vessel user obtains a fishing result that he/she wants to record while maneuvering the marine vessel 1 by using the marine vessel maneuvering apparatus 30, since the marine vessel user is able to quickly record the location information 37 without changing the operation device each time, it is possible to improve the convenience of recording the location information 37.

As shown in FIG. 3 and FIG. 4, in a preferred embodiment of the present invention, the recording operation portion 33 includes a pressable button (press button) that is operated by pressing the button, and the press button has an arc shape centered on the operator 31. By using the recording operation portion 33 including the press button, regardless of whether the marine vessel user is right-handed or left-handed, for example, when the marine vessel user releases his or her thumb that has been operating the operator 31, the marine vessel user is able to operate the recording operation portion 33 with his or her thumb. As a result, it is possible to quickly record the location information 37. The location information 37 is location information obtained from the GPS 17. As a result, it is possible to obtain the location information 37 as accurate location information.

As described above, the fish finder 40 and the information communication network 200 are the recording destination (the transmitting destination) of the location information 37. The controller 36 is able to communicate with the fish finder 40 and the information communication network 200 via the transmitter 34 and the transmitting and receiving apparatus 19. When the recording operation portion 33 is pressed, the controller 36 generates a signal regarding the location information 37. The signal regarding the location information 37 is transmitted from the transmitter 34 and is received by the transmitting and receiving apparatus 19. After that, the signal regarding the location information 37 is transmitted to the fish finder 40 and the information communication network 200. In the case that the signal regarding the location information 37 received by the transmitting and receiving apparatus 19 is transmitted to the fish finder 40, the signal regarding the location information 37 is received by the fish finder 40 via the first gateway 23 and the MFD 9 in order (hereinafter, this transmission path is referred to as "a first path") by communications by the CAN described above. Furthermore, the signal regarding the location information 37 is able to be received by the fish finder 40 via the second gateway 24 (hereinafter, this transmission path is referred to as "a second path"). Moreover, the signal regarding the location information 37 is able to be received by the fish finder 40 by using both the first path and the second path. In addition, in the case that the signal regarding the location information 37 received by the transmitting and receiving apparatus 19 is transmitted to the information communication network 200, the signal regarding the location information 37 is received by the information communication network 200 by wireless communication described above. It should be noted that the marine vessel maneuvering apparatus 30 may be able to switch the transmitting destination of the location information 37. In this case, for example, the marine vessel maneuvering apparatus 30 is able to select only the fish finder 40, select only the information communication network 200, or select both the fish finder 40 and the information communication network 200 as the transmitting destination of the location information 37.

Figure 5:
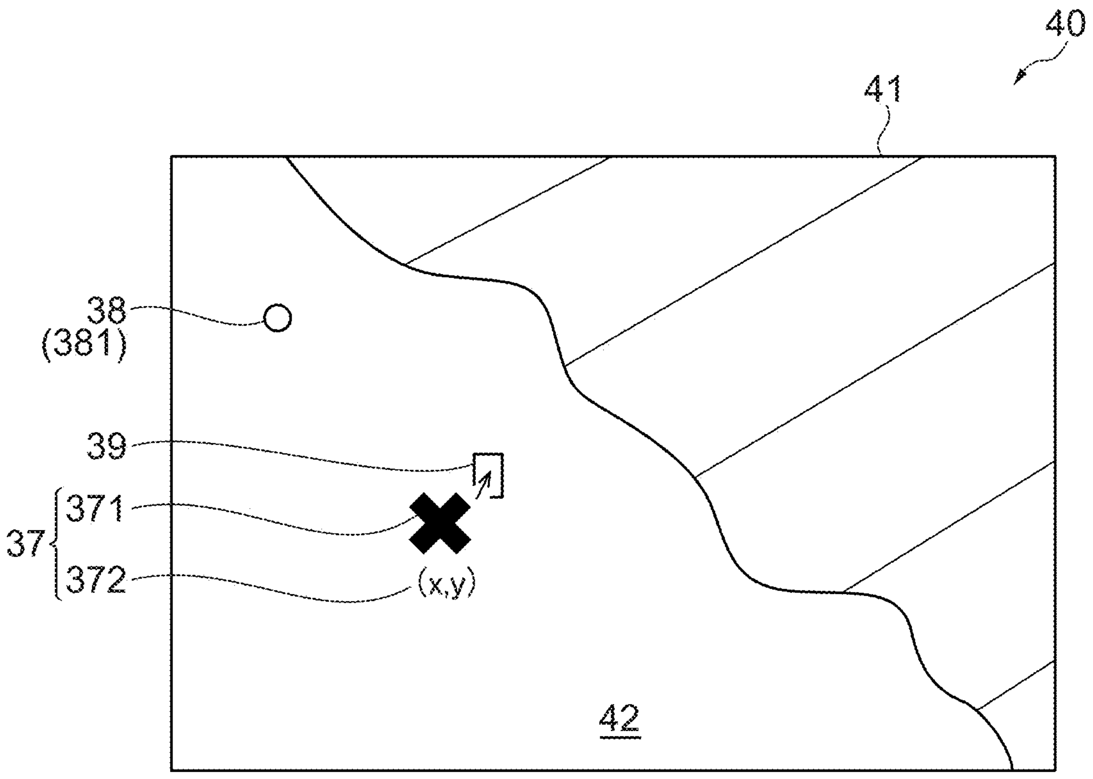
FIG. 5 is a display example of location information displayed on a fish finder.

FIG. 5 is a display example of the location information 37 displayed on the fish finder 40. As shown in FIG. 5, the location information 37, which is recorded in the fish finder 40 by the recording operation portion 33, is displayed on the display 41 of the fish finder 40. The location information 37 is displayed superimposed on a nautical chart (a map) 42 around the marine vessel 1. In addition, the location information 37 includes a mark 371 and coordinates 372. The mark 371 indicates the place where fishing is performed (the fishing point), and the coordinates 372 indicate the coordinates of the place where the fishing is performed (the fishing point), that is, the latitude and the longitude of the place where the fishing is performed (the fishing point). It should be noted that the mark 371 is an "x" mark in the configuration shown in FIG. 5, but is not limited to this. In addition, although the arrangement location of the coordinates 372 is below the mark 371 in the configuration shown in FIG. 5, it is not limited to this. By displaying the location information 37 on the display 41 in this way, for example, in the case that the marine vessel user is fishing at a fishing point and the marine vessel 1 has drifted from the fishing point, the marine vessel user is able to return the marine vessel 1 to the original fishing point by maneuvering the marine vessel 1 by using the marine vessel maneuvering apparatus 30 while referring to the displayed location information 37. In addition, in the case that the marine vessel user wants to head to the fishing point again at a later date, the marine vessel user is able to direct the marine vessel 1 to the fishing point by referring to the location information 37. It should be noted that the marine vessel 1 may be configured to automatically head to the fishing point when the marine vessel user gives an instruction to head to the fishing point.

As described above, the controller 36 is able to transmit the location information 37 to the information communication network 200 via the transmitter 34 and the transmitting and receiving apparatus 19. The information communication network 200 is able to perform wireless communication conforming to the same communication standard as the transmitting and receiving apparatus 19. The information communication network 200 is able to record the location information 37 from the marine vessel maneuvering apparatus 30. In a preferred embodiment of the present invention, the information communication network 200 may include a server, etc., and to provide a cloud service. As a result, it is possible to perform commercial transactions such as e-commerce (Electronic Commerce) via the information communication network 200, and at least one of browsing (paid browsing) and transfer (sale) of the location information 37 becomes possible. For example, as shown in FIG. 2, in the case that there are general consumers who have information terminals 60 such as a smartphone and a desktop personal computer that are able to communicate with the information communication network 200, any one of the general consumers is able to purchase the location information 37 by using his or her own information terminal 60.

The recording operation portion 33 is also able to record other fishing information 38 different from the location information 37 (hereinafter, referred to as "other information 38"). As with the location information 37, the other information 38 is recorded in the fish finder 40 and the information communication network 200. Here, "the other information 38" may be, for example, at least one of location information of a point through which the marine vessel 1 has passed and location information when equipment used for fishing such as a fishing rod is changed. As shown in FIG. 5, the other information 38 is displayed on the display 41 of the fish finder 40 by a mark 381 having a shape different from the mark 371.

The controller 36 is able to switch the information recorded by the recording operation portion 33 to the location information 37 or the other information 38 in response to the number of times of pressing the recording operation portion 33 (the press button) or a length of time per pressing the recording operation portion 33 (the press button). For example, when the recording operation portion 33 is pressed once, recording of the location information 37 becomes possible, and when the recording operation portion 33 is pressed twice in succession, recording of the location information of the point through which the marine vessel 1 has passed becomes possible. Further, when the recording operation portion 33 is long-pressed once, recording of the location information when the equipment used for fishing is changed becomes possible. By such pressing operations of the recording operation portion 33, since it is possible to appropriately and easily switch the information that the marine vessel user wants to record by the recording operation portion 33, it is possible to improve the convenience of selecting the information that the marine vessel user wants to record by the recording operation portion 33. It should be noted that the other information 38 may include coordinates. Moreover, the other information 38 is not limited to the location information of the point through which the marine vessel 1 has passed or the location information when the equipment used for fishing is changed.

Furthermore, in the information processing system 100, by using the marine vessel maneuvering apparatus 30, at least one piece of information regarding fishing result information, date and time information, or weather information (hereinafter, referred to as "accompanying information 39") is able to be recorded in association with the location information 37. In this case, the marine vessel maneuvering apparatus 30 functions as an information terminal able to input and output the accompanying information 39. As a result, it is possible to perform the operation of recording the location information 37 and the operation of recording the accompanying information 39 with one marine vessel maneuvering apparatus 30, and it is possible to further improve the convenience of recording the information.

The fishing result information includes information such as sizes and types of fishes that have been caught at the fishing point. The fishing result information is inputted/outputted in the form of, for example, pictures, characters, etc. The date and time information is date and time information when fishing is performed at the fishing point, and is obtained from, for example, the GPS 17. The weather information is weather information when fishing is performed at the fishing point, and for example, is obtained from the Internet based on the location information 37 and the date and time information. The accompanying information 39 is transmitted to the fish finder 40 and the information communication network 200 together with the location information 37 and is recorded. The marine vessel maneuvering apparatus 30 is also able to select the transmission of the fishing result information, the date and time information, and/or the weather information. As shown in FIG. 5, the accompanying information 39 is displayed near the location information 37 in a pop-up window. As a result, it is possible to minimize the proportion of the accompanying information 39 occupied within the display 41, and it is possible to maintain the visibility of the nautical chart 42.

As described above, although the marine vessel maneuvering apparatus 30 has not only the function of maneuvering the marine vessel 1 but also the function as the information terminal able to input and output the accompanying information 39, a separate information terminal different from the marine vessel maneuvering apparatus 30 may be provided, and the input and output of the accompanying information 39 may be performed by the separate information terminal.

As described above, it is possible to perform the maneuvering of the marine vessel 1 and the operation of recording the location information 37 and etc., with one marine vessel maneuvering apparatus 30, thus the operability is improved. Moreover, in a preferred embodiment of the present invention, the recording operation portion 33 is used to record the location information 37 of the fishing point, but is not limited to this. For example, in the marine vessel maneuvering apparatus 30, the recording operation portion 33 is also able to be used to record location information of a place where an activity is performed using the marine vessel 1 such as a diving point.

Further, in the case that the marine vessel user uses the marine vessel maneuvering apparatus 30, sometimes the marine vessel user leaves the maneuvering seat 4 and maneuvers the marine vessel 1 in a place where the lanyard cannot reach. At this time, the marine vessel user needs to wear a falling water detection sensor 50 (see FIG. 2) as a wearable device, for example, on his or her wrist or arm. If the marine vessel user falls into the water, the falling water detection sensor 50 detects that the marine vessel user has fallen into the water, and wirelessly transmits the detection result to the transmitting and receiving apparatus 19. At this time, the engines of the outboard motors 3 are emergency-stopped.

Moreover, from the viewpoint of a fail-safe, it is recommended that the marine vessel user wears the falling water detection sensor 50 together with the lanyard when maneuvering the marine vessel 1 in a place where the lanyard reaches.

Although preferred embodiments of the present invention have been described above, the present invention is not limited to the above-described preferred embodiments, and various modifications and changes can be made within the scope of the gist thereof. For example, the marine vessel 1 includes the outboard motors 3, but the type of the marine vessel 1 is not limited, and the marine vessel 1 may be a marine vessel including inboard/outboard motors or inboard motors. In addition, the recording operation portion 33 is not limited to the configuration shown in FIG. 3 and FIG. 4, and may include, for example, a cross button (a cross key).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel maneuvering apparatus to maneuver a marine vessel by wireless communication, the marine vessel maneuvering apparatus comprising:
- an operator including:
  - a first operator located on a front side of the marine vessel maneuvering apparatus, the first operator being tiltable in a plurality of directions to cause the marine vessel to move in forward, reverse, left, and right directions in which the first operator is tilted, the first operator including a columnar portion having a columnar shape and a flat portion having a flat shape provided at a top of the columnar portion; and
  - a second operator located on a back side of the marine vessel maneuvering apparatus, the second operator being tiltable to cause the marine vessel to turn in port and starboard directions in which the second operator is tilted;
- a recorder including a press button having an annulus sector shape having a center point on the first operator and operable to record location information of a place where fishing is performed using the marine vessel that is moved by operating the operator, and record other information about the fishing that is different from the location information; and
- a controller connected to at least the recorder and configured or programmed to switch information recorded by the recorder to the location information or the other information about the fishing in response to the number of times of pressing the press button or a length of time per pressing the press button.

2. The marine vessel maneuvering apparatus according to claim 1, wherein the controller is configured or programmed to communicate with an external information communication network and to transmit the recorded location information to the external information communication network.

3. The marine vessel maneuvering apparatus according to claim 1, wherein the recorder is operable to record the location information in a fish finder.

4. The marine vessel maneuvering apparatus according to claim 1, wherein the other information about the fishing is at least one of location information of a point through which the marine vessel has passed or location information when equipment used for the fishing is changed.

5. The marine vessel maneuvering apparatus according to claim 1, wherein the location information is location information obtained from a Global Positioning System.

6. The marine vessel maneuvering apparatus according to claim 1, wherein the operator is operable to move the marine vessel in a tilting direction of the operator.

7. The marine vessel maneuvering apparatus according to claim 1, wherein the marine vessel maneuvering apparatus is provided at a location different from a maneuvering seat.

8. An information processing system comprising:
- a marine vessel maneuvering apparatus to maneuver a marine vessel; and
- a communication apparatus communicably connected to an information communication network; wherein
- the marine vessel maneuvering apparatus includes:
  - an operator including:
    - a first operator located on a front side of the marine vessel maneuvering apparatus, the first operator being tiltable in a plurality of directions to cause the marine vessel to move in forward, reverse, left, and right directions in which the first operator is tilted, the first operator including a columnar portion having a columnar shape and a flat portion having a flat shape provided at a top of the columnar portion; and
    - a second operator located on a back side of the marine vessel maneuvering apparatus, the second operator being tiltable to cause the marine vessel to turn in port and starboard directions in which the second operator is tilted;
  - a recorder including a press button having an annulus sector shape having a center point on the first operator and operable to record location information of a place where fishing is performed using the marine vessel that is moved by operating the operator, and record other information about the fishing that is different from the location information; and
  - a controller connected to at least the recorder and configured or programmed to switch information recorded by the recorder to the location information or the other information about the fishing in response to the number of times of pressing the press button or a length of time per pressing the press button;
- the communication apparatus is operable to transmit the recorded location information to the information communication network; and
- the communication apparatus is operable to allow a marine vessel user to perform browsing of or transfer of the location information via the information communication network.

9. The information processing system according to claim 8, wherein the recorder is operable to record at least one of a fishing result information, date and time information, or weather information in association with the location information.

10. The information processing system according to claim 8, wherein the operator is operable to move the marine vessel in a tilting direction of the operator.

11. The information processing system according to claim 8, wherein the browsing of the location information includes paid browsing of the location information.

12. The information processing system according to claim 8, wherein the transfer of the location information includes sale of the location information.

* * * * *